United States Patent [19]

Sugimoto

[11] Patent Number: 4,567,963
[45] Date of Patent: Feb. 4, 1986

[54] EDDY CURRENT RETARDER FOR USE IN EMERGENCY ESCAPE AS FROM HIGHER STORIES OF A BUILDING

[75] Inventor: Kazutoshi Sugimoto, Minami-ashigara, Japan

[73] Assignee: Kabushiki Kaisha Miyano Seisakusho, Nagano, Japan

[21] Appl. No.: 612,868

[22] Filed: May 22, 1984

[30] Foreign Application Priority Data

May 26, 1983 [JP] Japan .................. 58-91555

[51] Int. Cl.$^4$ .............................................. A62B 1/10
[52] U.S. Cl. .................................... 182/236; 182/231
[58] Field of Search ............... 182/231, 233, 236, 238; 188/267

[56] References Cited

U.S. PATENT DOCUMENTS

| | | | |
|---|---|---|---|
| 197,899 | 12/1877 | Root | 182/238 |
| 1,167,239 | 1/1916 | Winkler | 182/238 |
| 1,647,506 | 11/1927 | Coughtry | 182/238 |
| 3,423,614 | 1/1969 | Poteate | 188/267 |
| 4,434,951 | 3/1984 | Nakajima | 188/267 |
| 4,469,196 | 9/1984 | Sadler | 182/231 |

Primary Examiner—Reinaldo P. Machado
Attorney, Agent, or Firm—Koda and Androlia

[57] ABSTRACT

A device utilizing energy conversion into heat by eddy currents for braking the descent of a refugee as from higher stories of a building in the event of a fire or other emergency. Included is a payoff reel rotatably mounted on a frame for paying off wire rope. The payoff reel is coupled via overdrive gears to a rotor of electrically conductive material which also is rotatably mounted on the frame and which rotates at a greatly increased speed in response to the rotation of the payoff reel. A permanent magnet or magnets of generally annular configuration are secured to the frame in an opposed relation to the rotor for inducing eddy currents therein upon rotation of the payoff reel. The induced eddy currents convert the energy of the revolving payoff reel into heat.

6 Claims, 4 Drawing Figures

EDDY CURRENT RETARDER FOR USE IN EMERGENCY ESCAPE AS FROM HIGHER STORIES OF A BUILDING

BACKGROUND OF THE INVENTION

This invention relates to a device for use in controlled descent from, for example, higher stories of buildings in the event of a fire or other emergency, with the evacuee suspended therefrom by wire rope or equivalent means. More specifically the invention concerns such a descent retarder utilizing the principle of conversion of dynamic energy into heat by magnetically induced eddy currents for braking the descent of the evacuee or refugee.

Most of the retarders heretofore suggested and used for the purposes in question have relied upon frictional conversion of dynamic energy into heat energy. Retarders of this known type have difficulties in developing constant heat and, therefore, a constant braking force. Few of them, moreover, are suitable for use in escape from considerable heights above ground, such as the higher stories of a multistory building. Because of these limitations of the conventional frictional retarders, and with increasing numbers of human lives lost in fires taking place in multistory buildings, there has been awaited the advent of a more reliable device that stands on an entirely different principle of operation.

Some large size motor vehicles today are equipped with eddy current retarders as one of the auxiliary brakes that supplement, together with exhaust brakes or the like, the main service brake. An eddy current retarder with a diameter of approximately 50 centimeters that can develop a braking torque of as much as 90 kilogram meters is in actual use on some large size trucks and trailers. It is evident from this that an eddy current retarder lends itself to use in controlling the descent of human beings. For the power generated by a man weighing 100 kilograms to descend 100 meters at a rate of 1.3 meters per second is only 1.7 horsepowers or so.

However, the eddy current retarders in use on motor vehicles need some basic alterations for use for the purpose now under consideration. The greatest problem is the use of electromagnets in the motor vehicle retarders for inducing eddy currents, making the retarders bulky, heavy, and expensive. The use of electromagnets is a necessity in motor vehicle retarders as the braking force must be released or otherwise controlled. In descent retarders, however, no such release or any other intentional control of the braking force is required.

SUMMARY OF THE INVENTION

The present invention provides a novel eddy current retarder of compact, lightweight, and inexpensive construction capable of stably providing a braking force required for safe descent of a refugee from considerable heights above ground, without requiring any manipulation by the refugee during the descent.

Summarized in brief, the descent retarder in accordance with the invention comprises a payoff reel rotatably mounted on a frame for paying off wire rope or like elongate flexible member. Also rotatably mounted on the frame is a rotor of electrically conductive material which is driven, via overdrive means, at an increased speed in response to the rotation of the payoff reel. The frame has permanent magnet means affixed thereto in the immediate vicinity of the rotor for inducing eddy currents therein upon rotation thereof.

The wire rope has one of its ends anchored to the payoff reel. The fefugee may hook or otherwise attach the other end of the rope to a suitable immobile object of the building, harness or otherwise fasten himself to the retarder frame, and then throw himself out into the air with the retarder. The retarder will then function to brake the descent of the refugee, with the rotational energy of the payoff reel converted into heat by the eddy currents induced in the rotor revolving in the magnetic field created by the permanent magnet means.

One of the most pronounced features of the invention resides in the use of a permanent magnet or magnets, in lieu of electromagnets employed by the eddy current retarders for motor vehicles, as a constant, rather than a variable, braking force which is all that a descent retarder is reqired to provide. This feature, combined with the large amount of energy thermally dissipated per unit weight of the device, makes the descent retarder of this invention extremely simple and inexpensive in construction, compact in size, and highly portable, all despite the reliability of its operation. The device assures the safe descent of the refugee at a constant speed that depends upon his own weight.

The overdrive means, preferably comprising a planetary gear train and additional gears, is well calculated to cause the rotor to revolve at a greatly multiplied speed in response to the rotation of the payoff reel. Accordingly, at the start of descent, the rotor acts as inertia brake to further retard the descent. The fear sensed by the refugee will therefore be much less than that offered by other types of devices.

According to a further feature of the invention the rotor is provided with means for effectively dissipating the heat generated therein by the eddy currents. The consequent avoidance of heat accumulation makes the retarder suitable for use even for very long falls, as in the case of escape from higher stories of multistory buildings.

The above and other features and advantages of the present invention and the manner of realizing them will become more apparent, and the invention itself will best be understood, from a study of the following description and appended claims, taken together with the attached drawings showing a preferred embodiment of the invention.

DETAILED DESCRIPTION OF THE INVENTION

Figure 1:
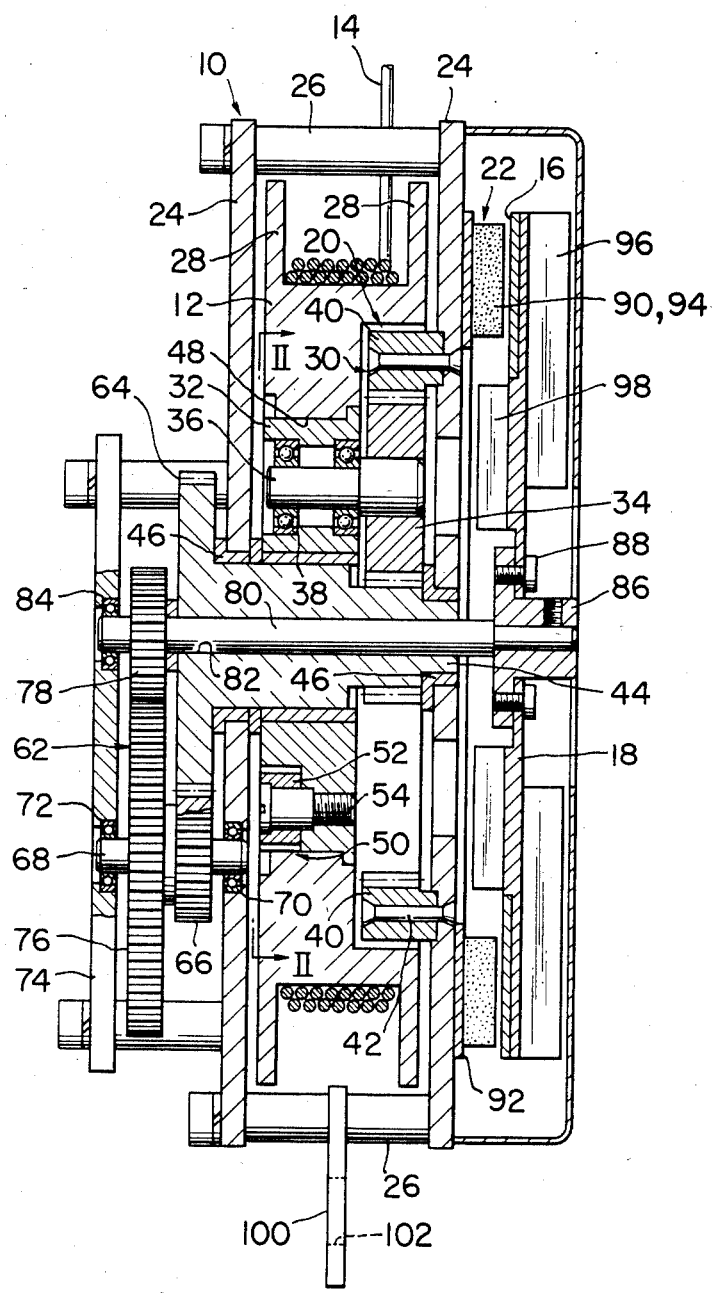
FIG. 1 is an axial section through a preferred form of the eddy current descent retarder embodying the principles of this invention.

The general organization of the eddy current descent retarder in accordance with the invention will become apparent from a consideration of FIG. 1. It broadly comprises:

1. a frame 10;
2. a payoff reel 12 rotatably mounted on the frame 10 and having any required length of wire rope or like elongate flexible member 14 coiled thereon;
3. a rotor 16 of electrically conductive material shown attached to one face of a carrier disk 18 supported on the frame 10 for rotation in a coaxial relation with the payoff reel 12;
4. overdrive gear means 20 for transmitting the rotation of the payoff reel 12 to the carrier disk 18; and
5. permanent magnet means 22 of annular arrangement affixed to the frame 10 in an opposed relation with the rotor 16.

The frame 10 is herein shown to comprise a pair of centrally bored disks 24 coaxially coupled together, with a spacing therebetween, by a plurality of ties 26. Complete with a pair of flanges 28, the payoff reel 12 is rotatably supported between the pair of framing disks 24 in a manner yet to be described. The wire rope 14 coiled on the payoff reel 12 has one end firmly anchored thereto in any convenient manner. The other end of the wire rope 14 is assumed to have a hook, snap link or the like, not shown, attached thereto for engagement with some stationary external object in the use of this descent retarder.

The rotation of the payoff reel 12 is transmitted to the carrier disk 18 by the overdrive gear means 20 including a planetary gear train generally designated 30. The planetary gear train 30 comprises:
1. a planet carrier 32 rotatably mounted on the frame 10 and disposed concentrically inwardly of the payoff reel 12;
2. one or more, preferably three, planet gears 34 each fixedly mounted on a shaft 36 which is rotatably journaled in bearings 38 in an eccentric position on the planet carrier 32;
3. an internally toothed ring gear or annulus 40 fastened at 42 to one of the framing disks 24 in a concentric relation with the planet carrier 32 and meshing with the planet gears 34; and
4. a sun gear 44 rotatably mounted the on the frame 10 via sleeve bearings 46 and disposed concentrically inwardly of the planet carrier 32 to mesh with the planet gears 34.

Figure 2:
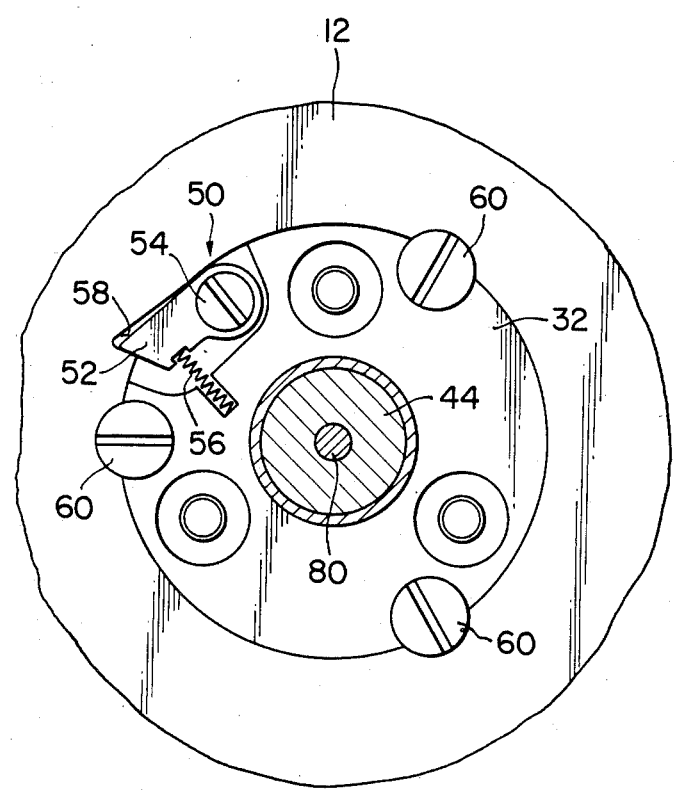
FIG. 2 is a fragmentary cross section through the descent retarder, taken along the line II—II in FIG. 1.

In the illustrated embodiment the planet carrier 32 of the planetary gear train 30 is slidably fitted in a hollow 48 defined axially through the payoff reel 12, so that the planet carrier and payoff reel are rotatable one with respect to the other. However, as will be seen from both FIGS. 1 and 2, a one-way clutch 50 is provided between payoff reel 12 and planet carrier 32 to allow torque transmission from the former to the latter only in the direction to unwind the wire rope 14 from the payoff reel. The one-way clutch 50 comprises a pawl 52 pivotally supported on the planet carrier 32 by a countersunk screw 54. A compression spring 56 acts between planet carrier 32 and pawl 52 to bias the latter into engagement in a notch 58 in the payoff reel 12. Normally sprung into engagement in the notch 58, the pawl 52 transmits to the planet carrier 32 the rotation of the payoff reel 12 when the wire rope 14 is unwound therefrom. The payoff reel 12 is free to rotate in the opposite direction relative to the planet carrier 32, as for rewinding the wire rope 14. A plurality of headed pins seen at 60 in FIG. 2 serve to prevent relative axial displacement of the payoff reel 12 and planet carrier 32.

It will have been seen from the foregoing that the planetary gear train 30 with the fixed annulus 40 transmits the rotation of the payoff reel 12 in the payoff direction to the sun gear 44. The overdrive gear means 20 include additional gearing 62 for augmenting the rotative speed of the sun gear 44 before imparting its rotation to the carrier disk 18 carrying the rotor 16.

The noted additional gearing 62 comprises a first drive gear 64 formed in one piece with the sun gear 44. The drive gear 64 meshes with a first driven gear or pinion 66 nonrotatably mounted on an eccentric shaft 68. This eccentric shaft has one end journaled in a bearing 70 on one of the framing disks 24. The other end of the eccentric shaft 68 is journaled in another bearing 72 on a support plate 74 secured to the frame 10. The first driven gear 66 is much less in diameter than the first drive gear 64. Also rigidly mounted on the eccentric shaft 68 is a second drive gear 76 meshing with a second driven gear or pinion 78 nonrotatably mounted on a center shaft 80 rotatably extending through an axial bore 82 in the unitary body of the sun gear 44 and first drive gear 64. The second driven gear 78 is smaller in diameter than the second drive gear 76. The center shaft 80 has one of its ends journaled in a bearing 84 on the support plate 74. Thus the overdrive gearing 62 causes rotation of the center shaft 80 at an increased speed in response to the rotation of the sun gear 44.

Rigidly mounted on the other end of the center shaft 80 is a hub 86 to which the carrier disk 18 is secured coaxially as by screws 88. The carrier disk 18 concentrically carries the rotor 16, which is shown as a flat ring of the same external diameter as the carrier disk, on its face directed toward the permanent magnet means 22 on the external surface of one of the framing members 24. Preferably the rotor 16 is fabricated from copper, and the carrier disk 18 from iron.

Figure 3:
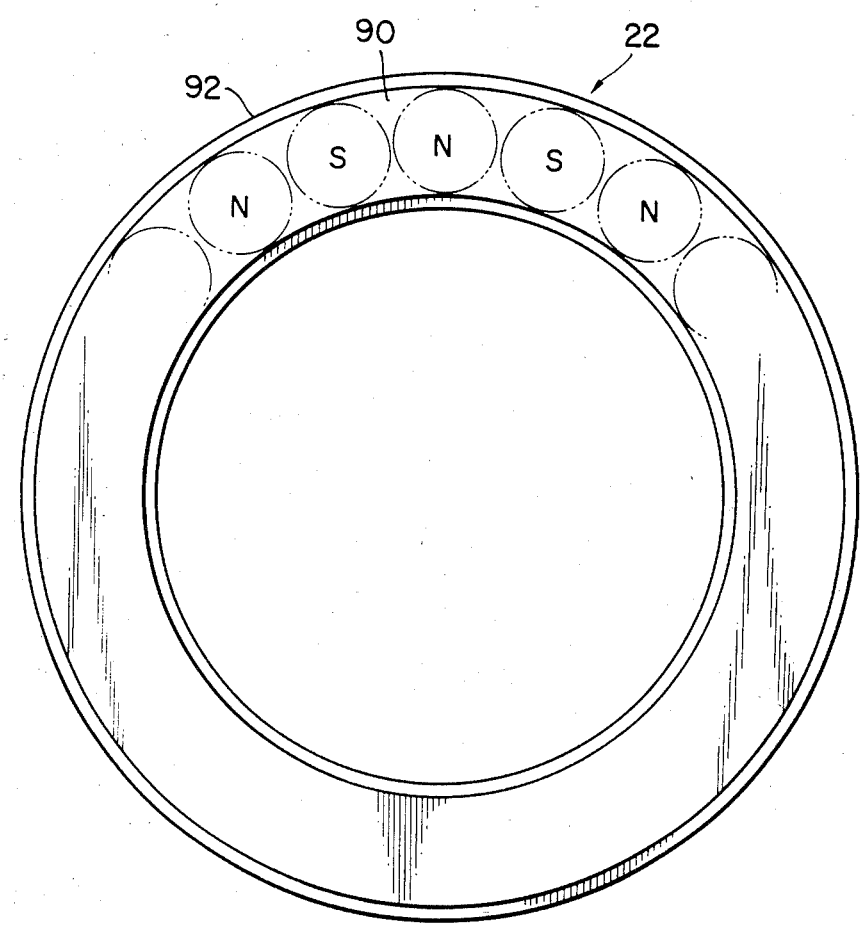
FIG. 3 is a front elevation of an example of the permanent magnet means in the descent retarder of FIG. 1.
Figure 4:
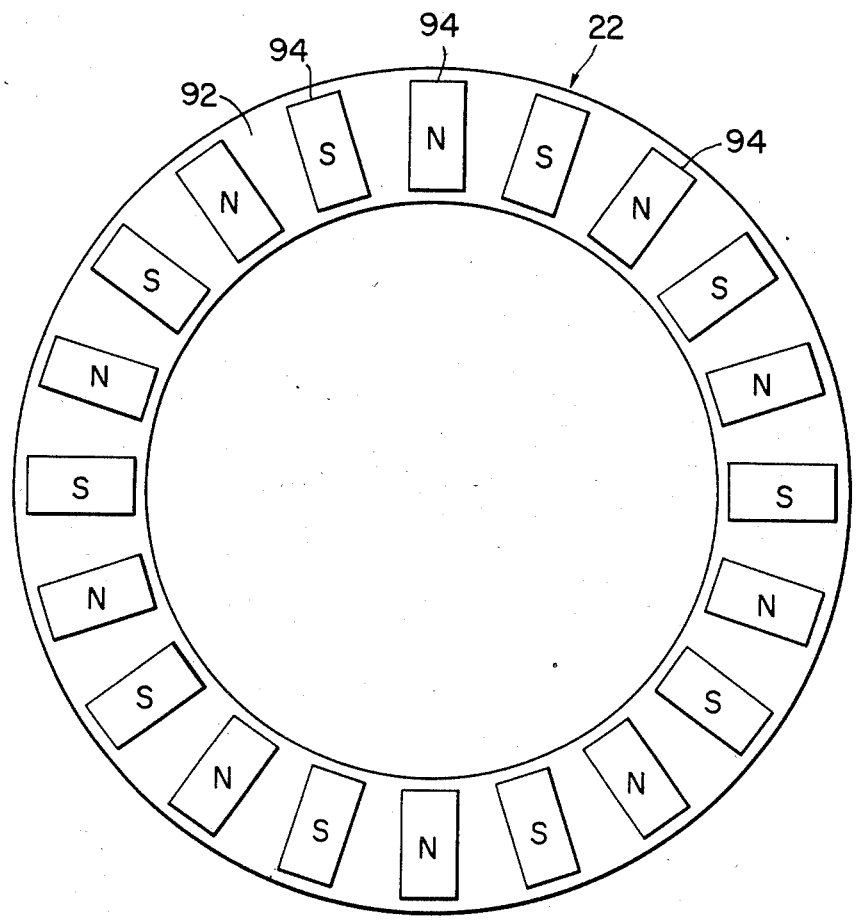
FIG. 4 is a similar view of another example of the permanent magnet means for use in the descent retarder of FIG. 1.

The permanent magnet means 22 for inducing eddy currents in the rotor 16 may take either of the two preferred forms given in FIGS. 3 and 4. The exemplified permanent magnet means 22 of FIG. 3 comprises an annular permanent magnet 90 bonded or otherwise secured to a flat iron ring 92. This iron ring is suitably attached to one of the framing disks 24, with the permanent magnet 90 concentrically opposed to the rotor 16. In practice the permanent magnet may be a ring of ferrite material that has been magnetized as by a magnetizer coil to provide alternating north and south seeking poles, desigated N and S respectively, for acting on the rotor 16.

The other example of permanent magnet means 22 shown in FIG. 4 comprises an annular row of discrete permanent magnets 94 bonded or otherwise fastened to the flat iron ring 92. With this iron ring secured to one of the framing disks 24, the annular row of permanent magnets 94 are also to be concentrically opposed to the rotor 16. The north and south seeking poles N and S of these permanent magnets are also arranged alternately for acting on the rotor 16. The permanent magnets 94 may be commercially available ferrite magnets, each of a size ten by twenty by five millimeters. The illustrated embodiment employs twenty such ferrite magnets at constant angular spacings.

With reference back to FIG. 1, as the rotor 16 rotates in the magnetic field created by the permanent magnet means 22 of the FIGS. 3 or 4 configuration, eddy currents are induced in the rotor, resulting in the production of heat. In the use of a ferrite magnet or magnets in the eddy current retarder as in the present invention, the flux density has been found to decrease by as much as 20 percent with every temperature rise of 100° C.

Consequently, should the retarder be not equipped with means for efficiently dissipating the heat emitted by the revolving rotor, its braking capacity would gradually decrease during the descent of the refugee, so that he might be injured upon landing after a very long fall.

The illustrated embodiment thoroughly defeats this possibility by providing two sets of radiator fins 96 and 98 arranged radially on the opposite surfaces of the carrier disk 18 to increase the total surface area thereof. The first set of radiator fins 96, lying on the side of the carrier disk 18 away from the permanent magnet means 22, extend substantially the full radius of the carrier disk 18. The second set of radiator fins 98 are shorter and are disposed radially inwardly of the rotor 16. Revolving with the carrier disk 18, the radiator fins 96 and 98 function to effectively liberate into air the heat generated in the rotor 16 by the induced eddy currents. The provision of the radiator fins 96 and 98 on both sides of the carrier disk 18 as in this embodiment, rather than on one side only, is preferred as the carrier disk will then be far less susceptible to warpage in use.

In the use of the eddy current descent retarder constructed as in the foregoing, the refugee engages the unshown hook, snap link or the like on the loose end of the wire rope 14 to some immobile object of the building or the like from which he is going to escape. Further, wearing a separately prepared strap or harness, he connects it to the descent retarder. For ready connection of the strap or harness the descent retarder has a connector plate 100 having a bore 102 on one of the ties 26 of its frame 10. The refugee connects the strap or harness to the bored connector plate 100 by a hook, snap link or the like.

Then the refugee throws himself out into the air together with the descent retarder. The payoff reel 12 will revolve and pay off the wire rope 14 under the weight of the refugee. The overdrive gear means 20 comprising the planetary gear train 30 and additional gearing 62 will transmit the rotation of the payoff reel 12 to the carrier disk 18, causing its rotation at an increased speed with the electroconductive rotor 16. The eddy currents consequently induced in the revolving rotor 16 by the permanent magnet means 22 will convert the dynamic energy of the payoff reel 12 into heat, which is to be efficiently liberated into air by the radiator fins 96 and 98. Thus the eddy current retarder will function to brake the descent of the refugee, assuring his safe landing on the ground.

What is claimed is:

1. An eddy current retarder for use in controlled descent of an evacuee as from higher stories of buildings in the event of an emergency, comprising:
   (a) a frame (10) having a pair of opposing disks (24);
   (b) a payoff reel (12) rotatably mounted between said disks for paying off an elongated flexible member (14), said reel having a hollow interior around its axis of rotation passing centrally of said disks perpendicularly to the same;
   (c) a carrier disk (18) mounted on the frame rotatably around said axis of rotation with one of said disks interposed between the carrier disk and the payoff reel;
   (d) overdrive means (20) in the form of a planetary gear train (34, 40, 44) disposed in said hollow interior of the payoff reel, said gear train connecting the payoff reel to said carrier disk for transmitting the rotation of the payoff reel to the carrier disk to rotate the latter at an increased speed in response to the rotation of the payoff reel;
   (e) permanent magnet means (22) fixedly mounted on that surface of said one of the disks, facing said carrier disk, said magnet means being of generally annular arrangement concentrically and closely opposed to said carrier disk;
   (f) a rotor (16) in the form of a flat ring secured to that surface of the carrier disk facing the magnet means, said rotor being of electrically conductive material and closely opposed to the same whereby upon rotation of the carrier disk eddy current is induced in the rotor to produce braking action; and
   (g) a plurality of fins (96) fixedly secured to that surface of the carrier disk remote from the magnet means, said fins disposed radially of the carrier disk so as to produce braking and heat dissipating function upon rotation of the carrier disk.

2. The eddy current retarder of claim 1 wherein the permanent magnet means comprises a single annular permanent magnet arranged concentrically with the rotor, the permanent magnet having north and south seeking poles arranged alternately thereon to act on the rotor.

3. The eddy current retarder of claim 1 wherein the permanent magnet means comprises an annular row of discrete permanent magnets arranged concentrically with the rotor, the permanent magnets having north and south seeking poles arranged alternately to act on the rotor.

4. The eddy current retarder of claim 1 wherein the planetary gear train comprises:
   (a) a planet carrier rotatably mounted on the frame in a concentric relation with the payoff reel for simultaneous rotation therewith at least in a direction to pay off the elongate flexible member;
   (b) at least one planet gear rotatably mounted on the planet carrier in an eccentric position thereon;
   (c) a ring gear fixedly mounted on the frame in a concentric relation with the planet carrier and meshing with the planet gear; and
   (d) a sun gear rotatably mounted on the frame in a concentric relation with the planet carrier and meshing with the planet gear;
   (e) the rotation of the sun gear being transmitted to the carrier disk.

5. The eddy current retarder of claim 4 further comprising:
   (a) a first drive gear rotatable with the sun gear of the planetary gear train;
   (b) a first driven gear meshing with the first drive gear, the first driven gear being of smaller diameter than the first drive gear;
   (c) a second drive gear rotatable with the first driven gear, the second drive gear being of greater diameter than the first driven gear; and
   (d) a second driven gear meshing with the second drive gear and coaxially coupled to the rotor for imparting rotation thereto, the second driven gear being of smaller diameter than the second drive gear.

6. The eddy current retarder of claim 4 wherein the payoff reel and the planet carrier of the planetary gear train are rotatable with respect to each other, and wherein the eddy current retarder further comprises a one way clutch acting between the payoff reel and the planet carrier to transmit to the latter only the rotation of the payoff reel in the direction to pay off the elongate flexible member.

* * * * *